United States Patent [19]
Klein et al.

[11] Patent Number: 5,681,992
[45] Date of Patent: Oct. 28, 1997

[54] PROCESS TO DETERMINE THE RESPONSE PRESSURE OF A BRAKE IN A VEHICLE BRAKING SYSTEM

[75] Inventors: Bodo Klein, Barsinghausen; Axel Stender, Hameln; Christian Wiehen, Burgwedel; Norbert Witte, Wunstorf, all of Germany

[73] Assignee: Wabco GmbH, Hanover, Germany

[21] Appl. No.: 618,825

[22] Filed: Mar. 20, 1996

[30] Foreign Application Priority Data

Mar. 24, 1995 [DE] Germany ............... 195 10 933.3

[51] Int. Cl.⁶ .............. B60T 8/00; B60T 8/28; G01L 5/28; R60T 13/66
[52] U.S. Cl. .............. 73/121; 73/132; 340/453; 364/426.01
[58] Field of Search .............. 73/116, 117, 121, 73/129, 132; 364/426.01; 340/453, 454

[56] References Cited

U.S. PATENT DOCUMENTS

| | | | |
|---|---|---|---|
| 4,337,651 | 7/1982 | Yoshino et al. | 73/129 |
| 4,520,663 | 6/1985 | Moore et al. | 73/129 |
| 4,567,757 | 2/1986 | Melocik et al. | 73/129 |
| 4,694,687 | 9/1987 | Bonin et al. | 73/116 |
| 4,895,021 | 1/1990 | Ishizeki | 73/129 |
| 5,299,452 | 4/1994 | Caron et al. | 73/129 |
| 5,357,800 | 10/1994 | Reuter et al. | 73/121 |
| 5,492,008 | 2/1996 | Schnerer et al. | 73/129 |

FOREIGN PATENT DOCUMENTS

| | | |
|---|---|---|
| 0 204 483 | 12/1986 | European Pat. Off. . |
| 0 408 844 A2 | 1/1991 | European Pat. Off. . |
| 0 600 481 A1 | 6/1994 | European Pat. Off. . |
| 40 35 805 C1 | 3/1992 | Germany . |
| 41 12 845 A1 | 10/1992 | Germany . |
| 38 29 949 C2 | 7/1993 | Germany . |
| 42 10 576 C1 | 8/1993 | Germany . |
| 42 06 238 A1 | 9/1993 | Germany . |
| 42 06 240 A1 | 9/1993 | Germany . |
| 42 17 409 A1 | 12/1993 | Germany . |
| 42 30 911 A1 | 3/1994 | Germany . |
| 42 43 245 A1 | 6/1994 | Germany . |
| 43 10 422 A1 | 7/1994 | Germany . |

*Primary Examiner*—George M. Dombroske
*Attorney, Agent, or Firm*—Meltzer, Lippe, Goldstein, et al.

[57] ABSTRACT

A process to determine the response pressure of a brake in a braking system of a vehicle comprises: measuring the existing vehicle deceleration of the vehicle to determine a value of ground-vehicle deceleration, supplying a test pressure to the brake, measuring the deceleration of the vehicle after the test pressure has been supplied to the brake to determine a value of vehicle test deceleration, and comparing the value of ground-vehicle deceleration and the value of vehicle test deceleration. If the value of vehicle test deceleration is greater than the value of ground-vehicle deceleration by more than a predetermined tolerance value, the steps of the process are repeated with a reduced test pressure until the difference between the values of ground-vehicle deceleration and vehicle test deceleration is no more than the predetermined tolerance value. However, if the value of vehicle test deceleration is equal to or less than the value of ground-vehicle deceleration, the steps of the process are repeated with a higher test pressure until the value of vehicle test deceleration exceeds the value of ground-vehicle deceleration by a value which is less than or equal to the predetermined tolerance value. In this way the response pressure, i.e., the lowest pressure which needs to be supplied to the brake in order to exert a braking force, can be determined.

8 Claims, 5 Drawing Sheets

PROCESS TO DETERMINE THE RESPONSE PRESSURE OF A BRAKE IN A VEHICLE BRAKING SYSTEM

This application contains subject matter which is related to the application entitled "Process to Brake A Vehicle" by the instant inventors which is being filed concurrently herewith.

BACKGROUND OF THE INVENTION

This invention relates to a process to determine the response pressure of a brake actuated by pressure in a vehicle braking system.

The term "brake" as used herein includes an individual module which produces a braking force directly, and also a plurality of such modules. Also included by the term "brake" can be the system components belonging to one or more such modules such as actuating, control and transmission devices downstream of the operating element (e.g., the brake pedal) actuated by the driver of the vehicle. This means the term "brake" can also include a braking circuit as part of the vehicle braking system or the complete braking system of a vehicle in a vehicle train.

If pressure, starting from atmospheric pressure, is applied to a brake, a braking force is produced by the brake but only if the pressure applied to the brake reaches a certain magnitude. This pressure which must be reached in order to produce a braking force may be detected by a pressure detection device and is referred to as the response pressure. It is dependent upon the response resistances of the components directly producing the braking force, or the system components installed between them and the pressure detection point. The response resistances may be due to friction and to restoring forces such as the force of a return spring.

The response pressure of a brake may be measured by means of a roller testing stand, which is a known method. In this method, pressure, starting from atmospheric pressure, is supplied to the brake until the roller testing stand indicates a braking force. The pressure in this moment is the response pressure. However, this test method is inefficient and inconvenient since the vehicle with the brake to be tested must be brought to a roller testing stand.

It is an object of the present invention to develop an efficient method for determining the response pressure of the brakes of a motor vehicle.

SUMMARY OF THE INVENTION

This object is achieved in a process to determine the response pressure of a brake in a braking system of a vehicle comprising:

(a) measuring the existing vehicle deceleration of said vehicle to determine a value of ground-vehicle deceleration, (b) supplying pressure to said brake in said braking system, (c) measuring the deceleration of said vehicle after the pressure in step (b) has been supplied to the brake to determine a value of vehicle test deceleration, (d) comparing the value of ground-vehicle deceleration and the value of vehicle test deceleration while taking into account a predetermined tolerance value, and (e) if the value of measured vehicle test deceleration is greater than the value of measured ground-vehicle deceleration by more than the predetermined tolerance value, repeating steps (a) to (d) at a reduced pressure until the difference between the value of the vehicle test deceleration and ground-vehicle deceleration is decreased to no more than the predetermined tolerance value, or (f) if the value of the measured vehicle test deceleration is equal to or less than that of the measured ground-vehicle deceleration, repeating steps (a) to (d) at a higher pressure until the value of vehicle test deceleration exceeds the value of ground-vehicle deceleration by a value which is less than or equal to the predetermined tolerance value.

In another embodiment of the invention, a process to determine the response pressure of a brake in a braking system of a vehicle comprises:

(a) supplying a pressure to the brake, (b) measuring the deceleration of the vehicle after the pressure in step (a) has been supplied to the brake to determine a value of vehicle test deceleration, (c) releasing the pressure supplied to the brake in step (a), (d) measuring the current vehicle deceleration of the vehicle to determine a value of ground-vehicle deceleration, (e) comparing the value of ground-vehicle deceleration with the value of vehicle test deceleration, and (f) if the value of vehicle test deceleration is greater than the value of ground-vehicle deceleration by more than a predetermined tolerance value, repeating steps (a) to (e) with a reduced pressure until the difference between the value of vehicle test deceleration and ground-vehicle deceleration is decreased to no more than the predetermined tolerance value, or (g) if the value of vehicle test deceleration is equal to or less than the value of ground-vehicle deceleration, repeating steps (a) to (e) with a higher pressure until the value of vehicle test deceleration exceeds the value of ground-vehicle deceleration by a value which is less than or equal to the predetermined tolerance value.

It is an important aspect of the instant invention that in order to determine the response pressure of the brake, the vehicle deceleration is measured rather than the braking force itself.

The response pressure of the brake or brakes may change while the vehicle is in use. A noticeable change could indicate a brake defect. The present invention provides a process for monitoring a brake, its components, or its system components by monitoring the response pressure. The present invention facilitates such monitoring since the equipment needed can be installed in the vehicle or is already present in the vehicle, can be modified. If the vehicle already contains a device which can detect pressures and a device which can obtain or process signals which are dependent on vehicle path and/or on vehicle speed, for instance, an antilock system, no additional equipment is necessary to implement the inventive process. Monitoring can then be carried out as a matter of routine, for instance at any time when the vehicle braking system is actuated or in selected brake operations.

A vehicle usually contains several brakes. If these have different response pressures, this may result in an undesirably high load on one or more of the brakes which respond earlier. This may result in uneven wear of wearing parts of the brake, such as linings, drums or disks. In order to eliminate these problems, the process of this invention can be further developed such that it changes the distribution of pressures among the brakes in dependence upon the response pressures or the ratio of the response pressures of the brakes. A brake with higher response pressure which responds later than other brakes will thus be supplied initially with a higher pressure than that supplied to the other brakes. Thus, all the brakes will be able to respond simultaneously in producing the braking force. This is especially important for vehicle trains in which different trailers with brakes that may have different response pressures are coupled to a motor vehicle.

Additional advantages of the invention are indicated in the description below through the embodiments shown in the drawings. The same reference numbers are used throughout for elements having the same function, full lines being used for actuating energy lines, broken lines for control lines, and dot-and-dash lines for signal lines.

DETAILED DESCRIPTION OF PREFERRED EMBODIMENTS

Figure 1:
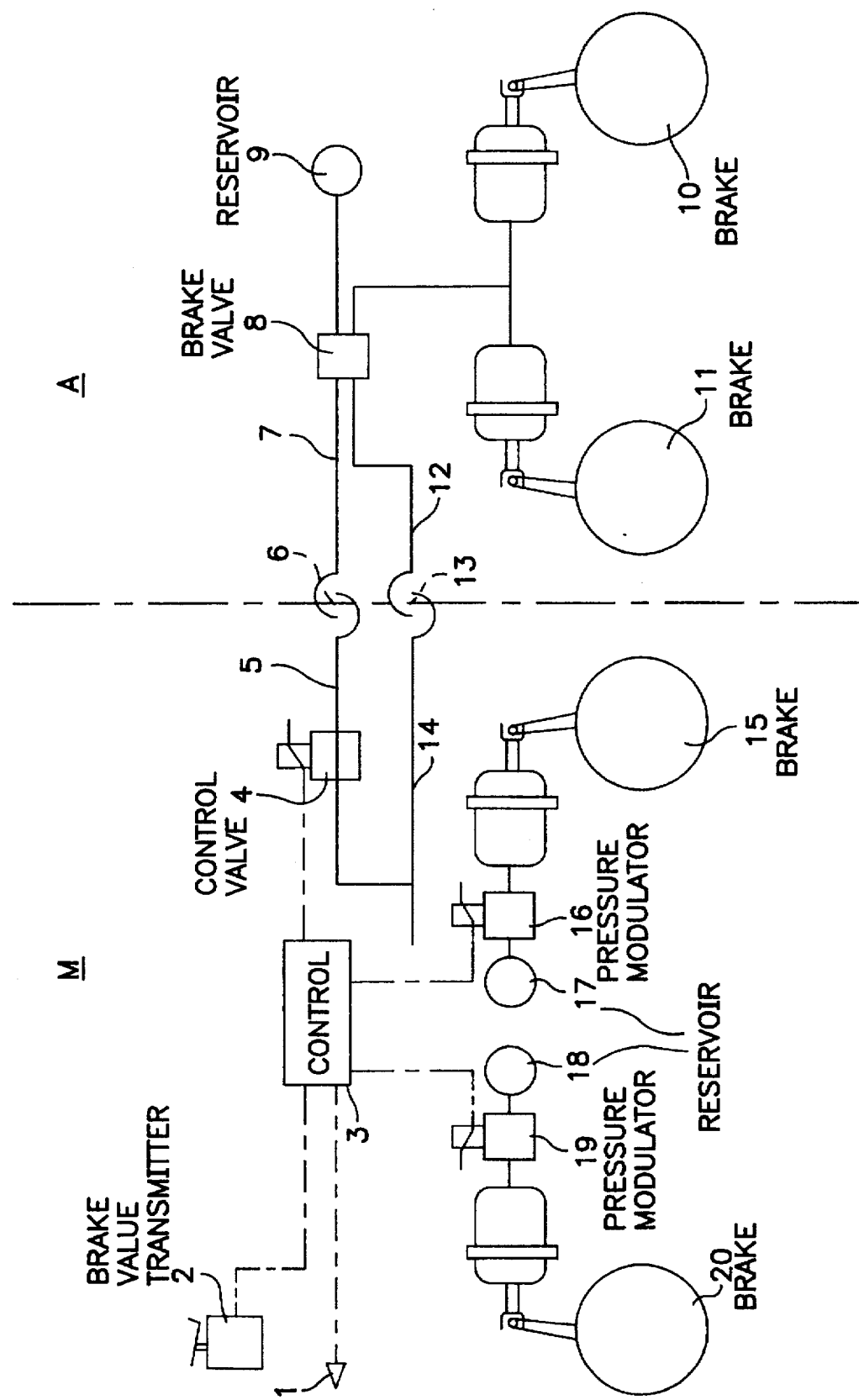
FIG. 1 schematically shows a vehicle train with a motor vehicle braking system M, and a trailer braking system A.

The vehicle braking system of a vehicle train is shown schematically in FIG. 1 and comprises a motor vehicle braking system M and a trailer braking system A. They are coupled in a known manner via supply lines 12 and 14 with coupling head 13, and trailer brake lines 5 and 7 with coupling head 6.

The trailer braking system contains pressure-activated trailer brakes on both sides of each trailer axle. Brakes 10 and 11 shown on one side include appertaining brake cylinders and mechanical transmission parts.

The trailer braking system A is controlled by a control device in the form of a trailer brake valve 8. The pressure medium transmitted from the motor vehicle braking system M via supply lines 12 and 14 to the trailer is conveyed via trailer brake valve 8 to a trailer reservoir. The trailer brake pressure from the motor vehicle braking system M is transmitted to trailer brake valve 8 via trailer brake lines 5 and 7. Upon receiving a trailer brake pressure, trailer brake valve 8 connects the trailer reservoir 9 to trailer brakes 10 and 11 and allows pressure to reach the latter from the trailer reservoir supply 9. The extent of said pressure is determined by the degree of trailer brake pressure. The trailer braking system A described is a conventional dual-line trailer braking system.

The motor vehicle braking system M contains pressure-actuated brakes on both sides of each axle. The motor vehicle brakes 15 and 20 shown on one side, include the appertaining brake cylinders and mechanical transmission means. Reservoirs 17 and 18 contain supply for brakes 15 and 20, respectively. Thus, the motor vehicle braking system M, in a conventional manner, has two brake circuits (18, 19, 20) and (17, 16, 15). Reservoirs 17 and 18 are supplied in the usual manner with pressure medium through separate lines secured against each other from a pressure means installed on the motor vehicle, not shown here.

The motor vehicle contains electrical controls which operate the braking system when it is actuated by the driver. The electrical controls include a brake value transmitter 2, electronic control unit 3, electrically controlled pressure modulators 16 and 19 for brakes 15 and 20, and trailer control valve 4, which is electrically controlled.

Pressure modulators 16 and 19 are located between reservoirs 17 and 18 and motor vehicle brakes 15 and 20, respectively. The trailer control valve 4 is connected to supply lines 12 and 14 on one side and to trailer brake lines 5 and 7 on the other side.

To actuate the vehicle brake system, the driver of the vehicle train introduces an actuating signal into brake value transmitter 2 by means of an actuating member which is part thereof, for instance by depressing a pedal. The actuating signal may be a force exerted on the actuating member and/or movement of the actuating member itself. When the actuating signal is received, brake value transmitter 2 transmits a brake value signal to electronic control unit 3. Electronic control unit 3 transforms the brake value signal into a pressure requesting signals which pressure modulators 16 and 19 and trailer control valve 4 can read.

Upon receiving this signal from electronic control unit 3, pressure modulators 16 and 19 connect reservoirs 17 and 18 to the respective brakes 15 and 20. The connection is maintained until a pressure has accumulated in brakes 15 and 20 which corresponds to the pressure requesting signals received by pressure modulators 16 and 19. Trailer control valve 4 connects trailer supply lines 12 and 14 to the trailer brake lines 5 and 7 upon receiving the signal from the electronic control unit 3 until a braking pressure corresponding to the pressure requested by the signal has accumulated in trailer brake lines 5 and 7. The signals which are transmitted to pressure modulators 16 and 19 and to trailer control valve 4 are representative of the pressures passing through these devices.

If the driver of the vehicle train stops or reduces the actuation of the vehicle braking system by stopping or reducing the actuating signal going into the brake value transmitter 2, electronic control unit 3 stops or reduces the signals, with the result that pressure modulators 16 and 19 and trailer control valve 4 reduce the pressures. In changing the brake value signal into pressure-requesting signals, electronic control unit 3 can accommodate any additional information supplied. This information may include the loading state of the motor vehicle and/or trailer, the loads on the motor vehicle axles, and the force in the connection between motor vehicle and trailer. The individual pressure-requesting signals and the appertaining pressures may therefore be different. To the extent described thus far, the vehicle braking system is a conventional, electronically controlled vehicle braking system.

This vehicle braking system makes it possible to determine the response pressures of the brakes in accordance with the inventive process. The term "brake" as used herein includes the complete motor vehicle braking system M per se, the complete trailer braking system A per se, or the individual braking circuits of the motor vehicle braking system M comprising motor vehicle reservoirs 17 and 18, pressure modulators 16 and 19, and brakes 15 and 20. The only additional equipment required for this purpose is a deceleration sensor 1. Deceleration sensor 1 which is connected to electronic control unit 3 transmits a deceleration signal to it which is representative of the vehicle deceleration.

However, if the braking system or the vehicle train already produces signals which depend on the distance traveled by the vehicle and/or the speed of the vehicle for other purposes, an additional deceleration sensor to carry out the inventive process is not required. This may be the case, for example, when the vehicle braking system is already equipped with an antilock braking system (ABS), which provides wheel deceleration signals corresponding to the vehicle deceleration. Also, this may occur if a tachosignal is produced in the vehicle train, from which electronic control unit 3 can calculate the vehicle deceleration.

The determination of the response pressure (pa) of the complete trailer braking system A, i.e., the pressure which first produces a braking force in the trailer braking system A, is described first. In a first embodiment of the invention, a calculation is made during brake tests which occur without the driver having actuated the braking system. Characteristics are programmed into electronic control unit 3 through which suitable points in time for the implementation of brake tests can be identified. The electronic control unit 3 is programmed so that the brake tests can be stopped in case of a change in characteristics before a particular measuring time (tm) which will be further explained below. Electronic control unit 3 can also be programmed so that a brake test is not performed every time these characteristics are present, but only selectively, for example, every xth time they occur, or randomly selected. Such characteristics could exist, e.g., when the driver of the vehicle releases the accelerator (gas pedal) without actuating brake value transmitter 2.

Figure 2A:
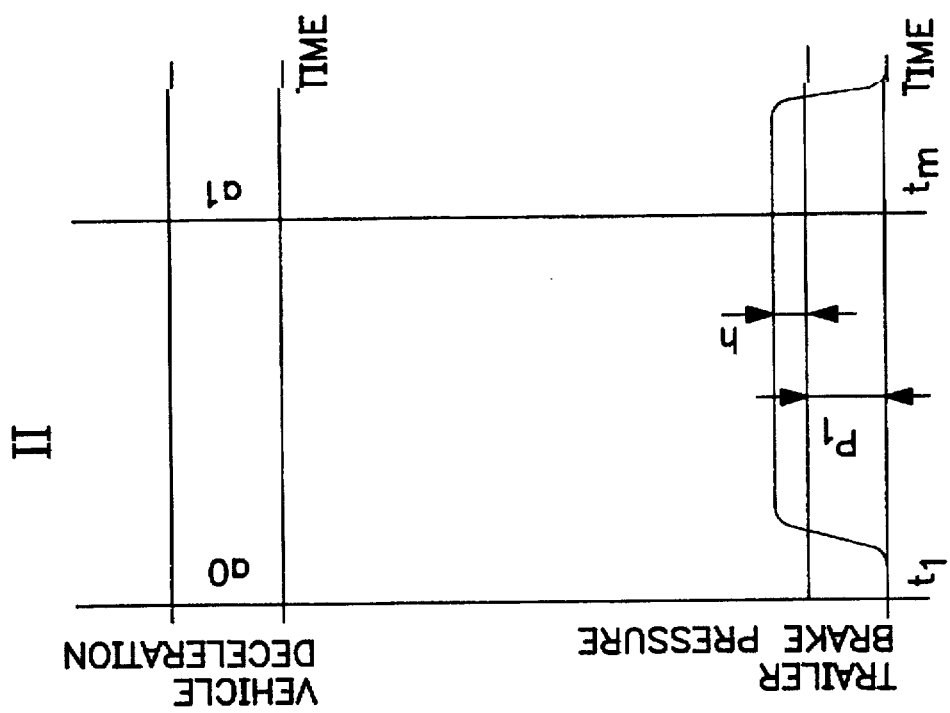
FIGS. 2 and 3 show a graph of the increase in trailer braking pressure as a function of time (bottom half). The top half of the graph shows vehicle train deceleration as a function of time in Brake Tests I, II, and III.
Figure 2B:
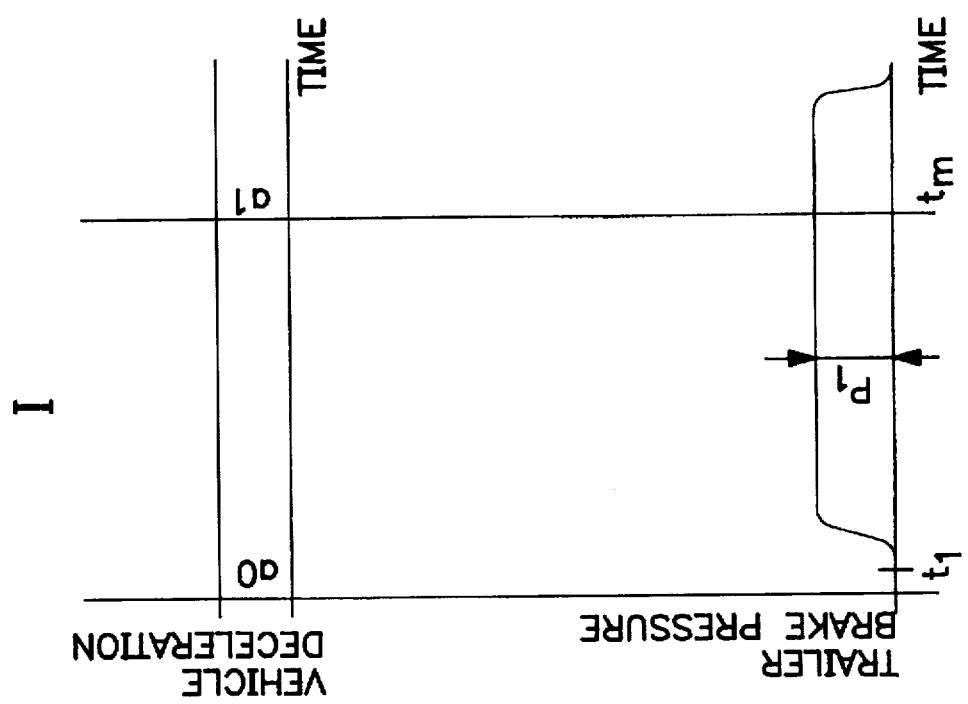
Figure 2C:
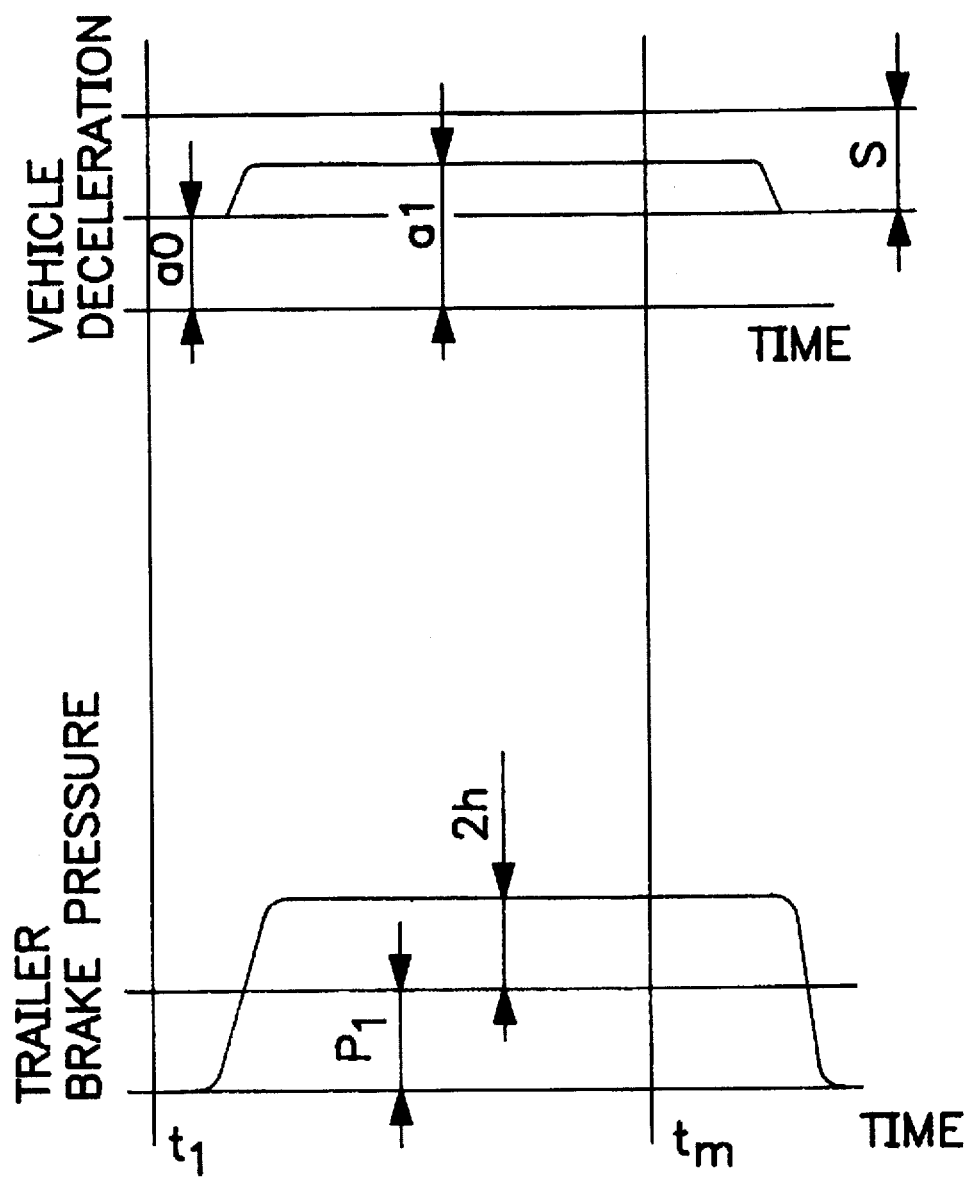

FIG. 2 shows, in the bottom portion thereof, the ideal progression of the trailer braking pressure for Brake Tests I, II and III as a function of time. The upper portion of FIG. 2 shows the ideal progression of the vehicle train deceleration as a function of time, in Brake Tests I, II and III.

When a brake test is started, electronic control unit 3 detects the existing deceleration of the vehicle train as the ground-vehicle deceleration (a0) at a point in time (t1). Ground-vehicle deceleration (a0) automatically occurs in a moving vehicle due to factors such as road resistance, road conditions such as curves and hills, motor braking effect or effect of a dynamic brake. After ground-vehicle deceleration (a0) is detected, the electronic control unit 3 transmits a signal to trailer control valve 4 requesting a low trailer test braking pressure (p1), e.g., of 0.5 bar. Due to the dependence of the trailer braking pressure on the pressure-request signal, the latter could also be designated pressure (p1).

However, the actual build-up of trailer braking pressure (p1) lags behind the pressure requesting signal. This is shown in FIG. 2 by the trailer braking pressure increasing as a function of time until it reaches the requested level (p1).

At a predetermined measuring time (tm), electronic control unit 3 detects the deceleration of the vehicle train as vehicle test deceleration (a1) which is existing after transmitting pressure requesting signal and the build-up of corresponding pressure in the trailer brakes 10 and 11. Times (t1) and (tm) are programmed into electronic control unit 3 by a time pulse generator contained in electronic control unit 3. Measuring time (tm) is predetermined so that pressure build-up has been completed in trailer brakes 10 and 11.

If trailer braking pressure (p1) exceeds the response pressure (pa) of the trailer braking system, vehicle test deceleration (a1) will be greater than the ground-vehicle deceleration (a0). If the trailer braking pressure (p1) does not reach the value of the response pressure (pa) of the trailer braking system or just reaches it, the vehicle test deceleration (a1) will be no greater than the ground-vehicle deceleration (a0). For verification, electronic control unit 3 compares ground-vehicle deceleration (a0) detected at point in time (t1) with the vehicle test deceleration (a1) detected at measuring time (tm).

As shown in the upper half of FIG. 2, this comparison results in vehicle test deceleration (a1) being equal to ground vehicle deceleration (a0) in Braking Test I. This result shows that the trailer test braking pressure (p1) did not exceed the response pressure (pa) of the trailer braking system A. These results do not show whether or not trailer test braking pressure (p1) is below the desired response pressure (pa) or has just reached it. Therefore, electronic control unit 3 is programmed so that it considers the desired response pressure (pa) of the trailer braking system reached, when it recognizes that the trailer test braking pressure (p1) has exceeded the actual response pressure (pa) within the range of a predetermined tolerance value (S).

After measuring time (tm), electronic control unit 3 cancels the pressure-request signal so that trailer test braking pressure (p1) and the corresponding pressures in trailer brakes 10 and 11 may be reduced.

If the characteristics for brake tests still apply, or if they apply again later, electronic control unit 3 initiates a second Brake Test II which repeats the steps of Brake Test I, while increasing the trailer test braking pressure (p1) by a predetermined step (h). For example, (h) may be 0.2 * (p1). With the numerical value of 0.5 bar assumed as an example for (p1) in Brake Test I, (h) is therefore 0.1 bar, and the trailer test braking pressure in Brake Test II is 0.6 bar.

As can be seen in FIG. 2, the ground-vehicle deceleration (a0) in Brake Test II may be greater than that in Brake Test I. This may be due to other initial conditions which appertain at the time of Brake Test II, e.g., to a steeper slope of the road. However, this plays no role because the absolute level of the detected vehicle deceleration is not needed for the determination of the response pressure (pa). As shown in FIG. 2, the increased trailer test braking pressure of 1.2 * (p1) does not lead to an increased vehicle deceleration in the Brake Test II, i.e., the test braking pressure in Brake Test II has not reached or has just reached the desired response pressure (pa).

In Brake Test III, electronic control unit 3 repeats the previous steps with the trailer test braking pressure increased by 2 h and having a value of 1.4 * (p1). FIG. 2 shows that in Brake Test III, the ground-vehicle deceleration (a0) is again different from the previous brake tests. Further, FIG. 2 shows that now vehicle test deceleration (a1) exceeds ground-vehicle deceleration (a0) and that electronic control unit 3 determines that a1>a0. This means that in Brake Test III, the trailer test braking pressure of 1.4 * (p1) has exceeded the desired response pressure (pa) of the trailer braking system.

Electronic control unit 3 must now verify acceptance of the trailer braking pressure 1.4 * (p1) of Brake Test III as the desired response pressure (pa) of the trailer braking system. For this purpose, electronic control unit 3 compares the difference (a1)–(a0) with the predetermined tolerance value (S). As FIG. 2 shows that (a1)–(a0)<S, electronic control unit 3 may accept trailer braking pressure applied in Brake Test III, i.e., (1.4 * p1) as the response pressure (pa) of the trailer braking system. This also applies when (a1)–(a0)=S.

Assume, however, that electronic control unit 3 determines in Brake Test III that the difference (a1)–(a0) exceeds the predetermined tolerance value (S), i.e., (a1)–(a0)>S. For this case, electronic control unit 3 is programmed to repeat the steps previously described for one or more additional brake tests. However, the last trailer test braking pressure 1.4 * (p1) will now be decreased until the difference (a1)–(a0) is between 0 and the predetermined tolerance value (S), that is until 0<(a1)–(a0)<S. In order for trailer test braking pressures other than those previously described to be possible, it is advisable to apply pressure reductions in steps of (0.1) * (p1).

Assume now that the program of electronic control unit 3 has ascertained a difference of (a1)–(a0) exceeding the predetermined tolerance value (S) in Brake Test I, i.e., (a1)–(a0)>S. In this event, electronic control unit 3 is programmed to reduce the trailer test braking pressure in the second, third, etc., braking tests in steps as described above until 0<(a1)–(a0)<S is ascertained. However, the changes in test braking pressures can again equal 0.2 * (p1), for example. If electronic control unit 3 ascertains that (a1) equals (a0), i.e., (a1)–(a0)=0 in carrying out the brake tests with reduced trailer test braking pressure, the steps described in Brake Tests I through III would be repeated.

It is apparent that through a suitable definition of the tolerance value (S) and the magnitude of the steps of increase or decrease in trailer test braking pressure, the response pressure (pa) of the trailer braking system can be determined to any degree of precision desired.

In a manner not shown here, electronic control unit 3 can be designed to detect ground-vehicle deceleration (a0) at a point in time which follows measuring time (tm). At this point, the pressure-requesting signal must have been cancelled and the trailer test braking pressure and the pressures of trailer brakes 10 and 11 must have dropped off completely.

The driver of the vehicle will not be aware of the test braking events as long as the trailer braking pressure does not exceed the response pressure (pa) of the trailer braking system. If the trailer test braking pressure exceeds the response pressure (pa), the driver of the vehicle may become aware of the braking test. However, since the difference between the vehicle test deceleration (a1) and the ground-vehicle deceleration (a0), i.e., (a1)–(a0), is very small, the driver of the vehicle may remain unaware of the braking test since it may be masked by the normal unevenness of the speed of the vehicle in operation.

Figure 3B:
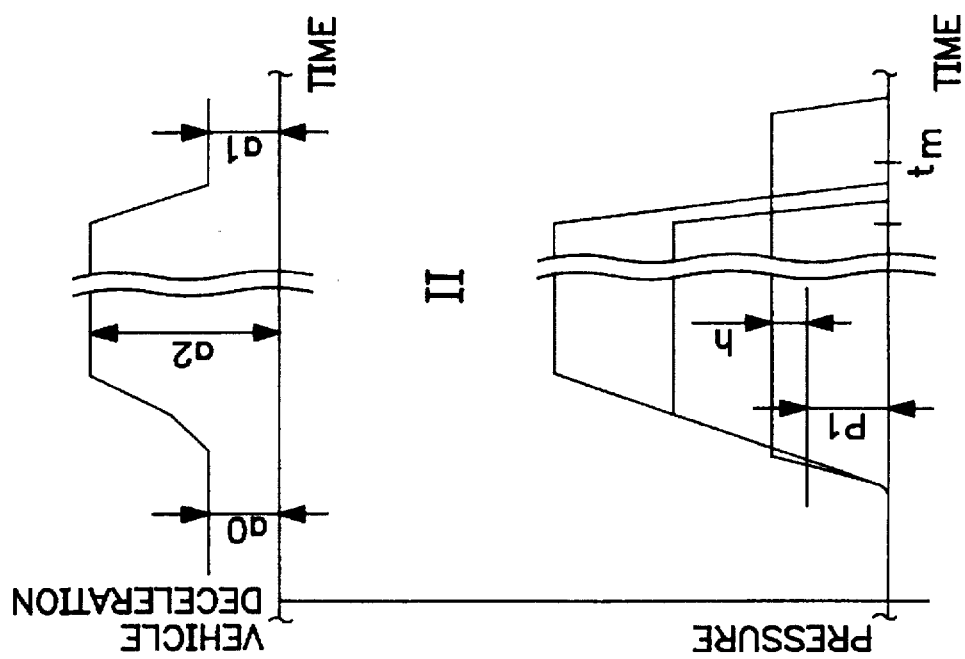
Figure 3A:
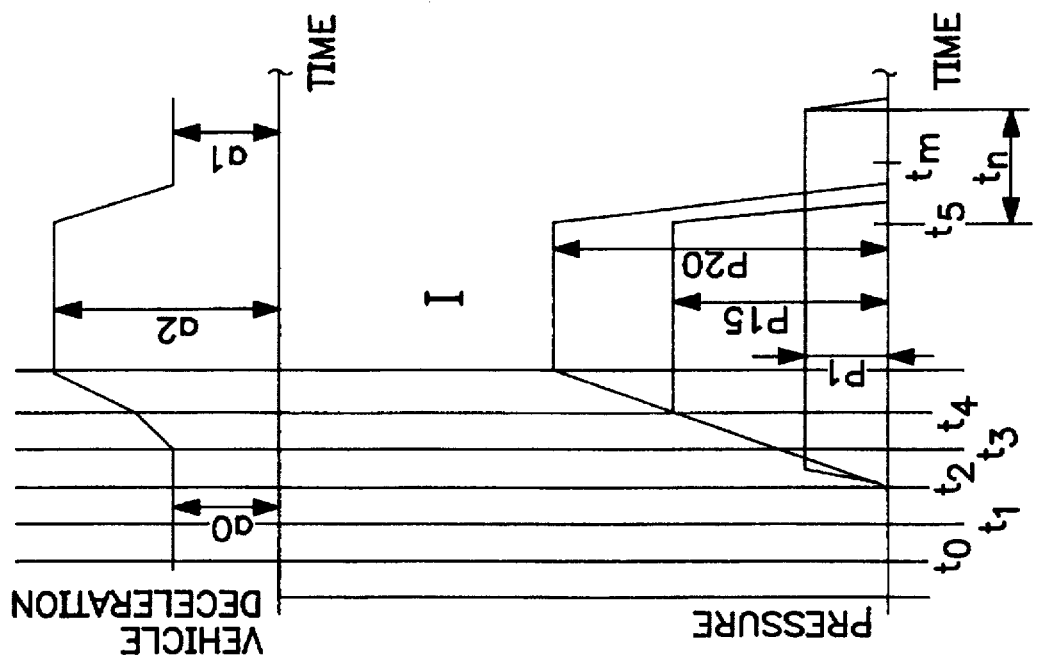
Figure 3C:
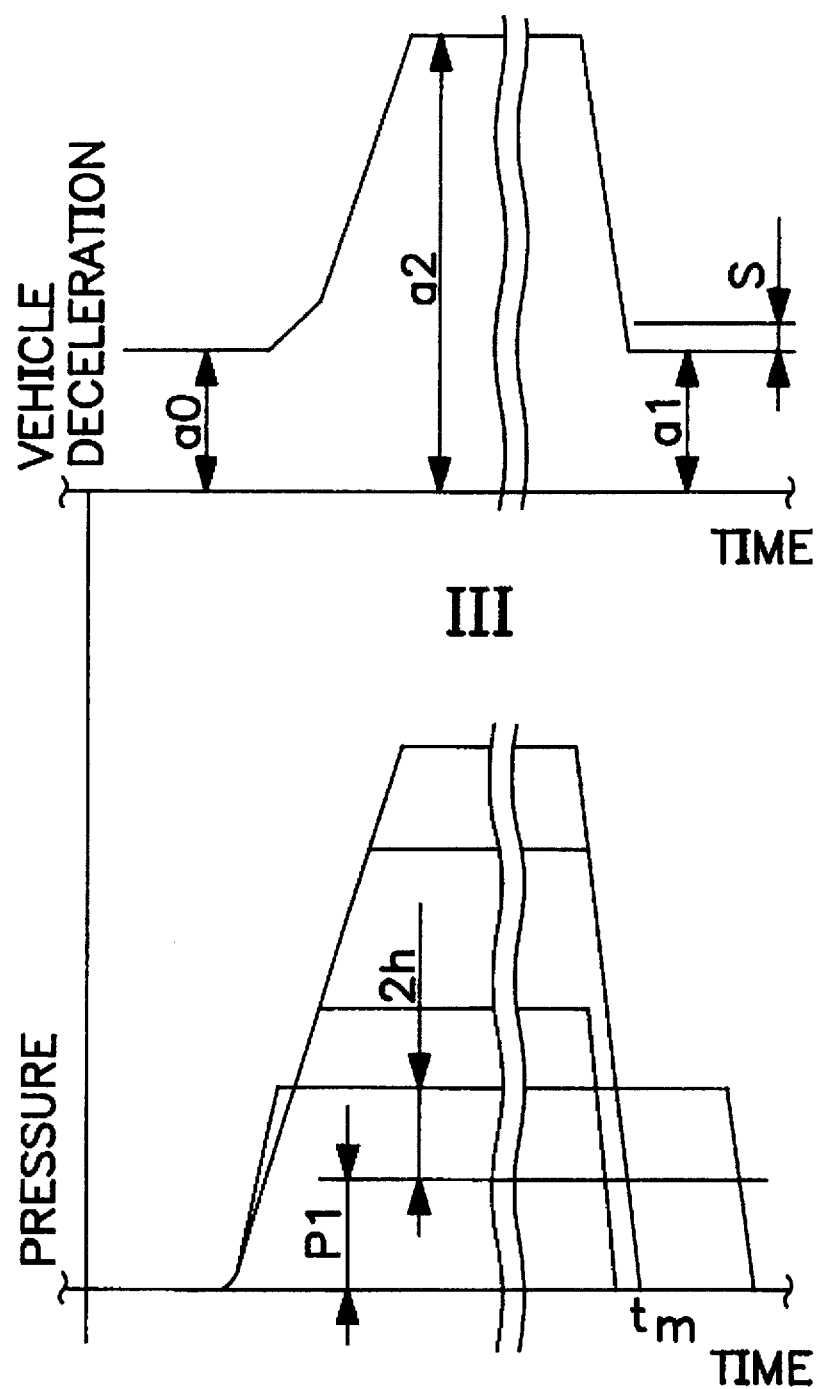

In a second embodiment of the invention illustrated in FIG. 3, Brake Tests I, II, and III are integrated into effective brake actions initiated by the driver of the vehicle. Since the trailer braking system A produces little, if any, braking action in these effective brake actions, it is advantageous to program electronic control unit 3 to perform test braking only when the driver of the vehicle actuates the vehicle braking system in the lower range of partial braking, i.e., with a minimal actuating signal and a correspondingly low level of pressure. In this embodiment, trailer test braking pressure can be designated as a first pressure and the pressure affecting the motor vehicle braking system M as a second pressure. Even when different pressures are active in the different braking circuits of the motor vehicle braking system M, together they can be considered as a second pressure when calculating the response pressure (pa) of the trailer braking system A. The reason for this is that different pressures in the motor vehicle system are not significant in the determination of the response pressure.

In this second embodiment, time (t1) for detecting ground-vehicle deceleration (a0) lies in a first variant within the response time of brake value transmitter 2. The "response time" of brake value transmitter 2 is the time delay which occurs between the first action of the driver of the vehicle on the brake value transmitter 2 at time (t0) and the first brake value signal emitted by brake value transmitter 2 at time (t2). Within this response time, a brake light switch signal is usually emitted by brake value transmitter 2 at time (t1). This brake light switch signal can also be used as an actuating signal for detecting ground-vehicle deceleration (a0) at time (t1).

Electronic control unit 3 is programmed to transmit a pressure requesting signal corresponding to the trailer test braking pressure to trailer control valve 4 at the end of the response time at the point in time (t2). The pressure-requesting signal is independent of the actuating signal introduced by the driver of the vehicle to the brake value transmitter 2. At the same time, electronic control unit 3 transmits pressure-requesting signals to pressure modulators 16 and 19 in the motor vehicle braking system M. These pressure requesting signals depend upon the actuating signal the driver of the vehicle introduced to brake value transmitter 2. Pressures (p15) and (p20) transmitted to motor vehicle brakes 15 and 20 correspond to these pressure-requesting signals.

As shown in the bottom half of FIG. 3, at time (t2), build up of the trailer test braking pressure (p1) and pressures (p15, p20) transmitted to motor vehicle brakes 15 and 20 begins. At time (t3), pressure (p15) transmitted to motor vehicle brake 15 has reached the value of the response pressure of the appertaining braking circuit (17, 16, 15) in the motor vehicle braking system M. As shown in the upper half of FIG. 3, at this point in time, the vehicle train deceleration increases starting from ground-vehicle deceleration (a0). At time (t4), pressure (p20) transmitted to motor vehicle brake 20 has reached the value of the response pressure of braking circuit (18, 19, 20) in the motor vehicle braking system M. The gradient of vehicle deceleration increases at this point in time (t4). After complete build-up of pressures (p15, p20) in motor vehicle brakes 15 and 20, and of the trailer braking pressure (p1) as well as of the corresponding pressures in trailer brakes 10 and 11, the vehicle is braked at a vehicle deceleration (a2).

Electronic control unit 3 can also be programmed to transmit the pressure-requesting signal to the trailer control valve 4 at time (t1) or between times (t1) and (t2). In this case, the increase of trailer test braking pressure (p1), contrary to what is shown in FIG. 3, starts at this point in time.

The pressures (p15, p20) transmitted to motor vehicle brakes 15 and 20 have different values. This assumes electronic control unit 3 processes different data in editing to the pressure-requesting data for pressure modulators 16 and 19. If electronic control unit 3 is not designed for this, or if the data can be such, then the pressures (p15, p20) are equal. FIG. 3 also is based on the assumption that the braking circuits of the motor vehicle braking system M have different response pressures. These response pressures may be equal, or differ so slightly from each other as to be considered equal.

At time (t5), the driver of the vehicle terminates the actuation of the vehicle braking system by stopping the brake actuation signal inputted into brake value transmitter 2, resulting in stoppage of the pressure-requesting signals to pressure modulators 16 and 19, and the pressures (p15, p20) transmitted to motor vehicle brakes 15 and 20 start to decrease. However, electronic control unit 3 maintains the pressure-requesting signal transmitted to trailer control valve 4 for a predetermined trailing time (tn) after time (t5). The duration of the trailing time (tn) is calculated so that a complete drop of the pressure (p15, p20) transmitted to motor vehicle brakes 15 and 20 takes place during that time in accordance with experience and that the measuring time (tm) lies within the trail time. Together with pressures (p15, p20) transmitted to motor vehicle brakes 15 and 20, the vehicle deceleration (a2) also drops. After the total drop of pressures (p15, p20), the vehicle deceleration is reduced to that of the vehicle test deceleration (a1). Electronic control unit 3 detects the vehicle test deceleration (a1) at the measuring time (tm). After detecting vehicle test deceleration (a1), electronic control unit 3 is programmed as described in connection with the first embodiment to detect the response pressure (pa) of the trailer braking system.

As schematically illustrated in FIG. 3, during Brake Test I, the vehicle test deceleration (a1) does not exceed ground-vehicle deceleration (a0), and it is therefore not certain whether trailer test braking pressure (p1) has attained the desired value of the response pressure (pa) of the trailer braking system.

During Brake Test II, the trailer test braking pressure is increased by step (h). However, the test-vehicle deceleration (a1) is still no greater than the ground-vehicle deceleration (a0). Thus, it is still not certain whether the desired response pressure (pa) of the trailer braking system is reached. Only at Brake Test III in which test trailer braking pressure is increased by (2 h), is the test-vehicle deceleration (a1) greater than ground-vehicle deceleration (a0) and the desired response pressure (pa) of the trailer braking system attained and exceeded.

Further, from FIG. 3 it can be seen that in Brake Test III, the difference between test vehicle deceleration (a1) and ground-vehicle deceleration (a0) is less than the predetermined tolerance value (S), i.e., (a1)−(a0)<S, so that electronic control unit 3 recognizes the trailer brake pressure of 1.4 * (p1) applied in this Brake Test III as the desired response pressure (pa) of the trailer braking system A.

In the second embodiment described above and illustrated in FIG. 3, ground-vehicle deceleration (a0) may be measured at the end of the brake test after time (tn) instead of at the beginning of a braking action at time (t1). In both the first and second embodiments described above, electronic control unit 3 can also be programmed to continuously measure the vehicle train deceleration and use momentary values at times (t1) and (tm) or, at later times as well, for determining the ground and/or vehicle test deceleration (a0) or (a1).

The foregoing discussion concerning the determination of response pressure (pa) of the trailer braking system A is applicable to the determination of the response pressure of the motor vehicle braking system M and to its individual braking circuits. For example, assume that the response pressure of the braking circuit (18, 19, 20) is to be determined. In this case, electronic control unit 3 has to act with the pressure requesting signal to pressure modulator 19 assigned to this braking circuit and the appertaining pressure (p20) as in the foregoing with the pressure requesting signal to trailer control valve 4 and the trailer test braking pressure (p1). In the alternative, with integration of the brake test into an effective braking action, the pressure (p20) is the first pressure and the pressure (p15) is the second pressure in this example.

The skilled artisan will recognize that the determination of the response pressure of the motor vehicle braking system M and the braking circuits associated therewith can be carried out as described above with our without the trailer braking system.

The response pressures described heretofore comprise response resistances occurring following the appertaining pressure-requesting signal. For the trailer braking system A, these include the response resistances of trailer control valve 4, trailer brake valve 8 and trailer brakes 10 and 11. For braking circuits (18, 19, 20) of the motor vehicle braking system M as an example, the response resistances include the response resistance of pressure modulator 19 and motor vehicle brake 20. If additional devices, as known but not shown here, are included in the braking systems, e.g., automatic brake force regulators, relay valves, pressure limitation valves, etc., their response resistances are also included in the determined response pressures.

In determining a response pressure, it is possible to exclude the response resistance of one or more of the system components of the motor vehicle brakes and trailer brakes. This is accomplished by installing an electric pressure sensor downstream of the system components not included. The pressure sensor is electrically connected to electronic control unit 3. Addition of the pressure sensor is often not necessary since a pressure sensor may already be installed due to the existing pressure modular construction. If an electric pressure sensor is installed, electronic control unit 3 must be programmed to measure the pressure-requesting signals to trailer control valve 4 or to the applicable pressure modulators 16 and 19 so that pressures corresponding to trailer test braking pressures are received and measured by the pressure sensor.

To determine the response pressure of a pressure medium input located at motor car brake 20, for example, a pressure sensor is installed at the appertaining brake cylinder or at a component directly supplying the brake cylinder with pressure, such as a pressure line or output of a pressure modulator. Electronic control unit 3 then adjusts the pressure-requesting signal sent to pressure modulator 19 in the brake tests described above so that the pressure sensor measures exactly the test pressure and reports it to electronic control unit 3.

A response pressure determined as above can be used in several different ways. Electronic control unit 3 can display the response pressure on a display device, not shown here. With a display device, the driver of the vehicle can monitor the braking system of the motor vehicle, its braking circuits, its brakes, the trailer braking system and trailer brakes, to check for changes in response pressures. Any change in response pressure could indicate that a defect has occurred.

Also, the electronic control unit 3 can be programmed to change one or more pressure-requesting signals as a function of the determined response pressures. If, for example, a response pressure of 0.5 bar has been determined by one of the methods described above, or from other sources, for both braking circuits (17, 16, 15) and (18, 19, 20) of the motor vehicle braking system M, then the motor vehicle system can be assigned a response pressure of 0.5 bar. The electronic control unit 3 may then ascertain a response pressure (pa) of 0.8 bar for the trailer braking system A. The trailer braking system A in this case would start braking only when the motor vehicle braking system is already braking with an effective pressure of 0.8−0.5=0.3 bar. Accordingly, the motor vehicle braking system M would be braking with an effective braking pressure of 1.3 bar while the trailer braking system A brakes with an effective pressure of 1.0 bar. This may result in an uneven wear of the brakes over a long period of use.

It is now possible to program electronic control unit 3 to counteract such uneven wear by adjusting the pressure-requesting signal to trailer control valve 4 to supply a trailer braking pressure that is larger by the difference between the response pressures. Electronic control unit 3 can also be programmed to account for different response pressures in the braking circuits (17, 16, 15) and (18, 19, 20) in a similar manner.

Adapting the trailer braking pressure to different response pressures of the motor vehicle braking system M and trailer braking system A is important, in particular, when a motor vehicle is operated with different trailers. The response pressures of the braking systems of different trailers can vary widely. After replacing one trailer with another, electronic control unit 3 determines the response pressure (pa) of the new trailer and then adapts the pressure-requesting signals sent to trailer control valve 4 as described above.

The explanations of one embodiment as given above apply directly or in corresponding fashion to the other embodiments insofar as they do not contain anything to the contrary.

The person schooled in the art will recognize that the above embodiments do not exhaust the area of protection of the invention but that this area of protection rather comprises all embodiments whose characteristics fall under the claims of the patent.

We claim:

1. A process to determine the response pressure of a brake in a braking system of a vehicle comprising:
    (a) measuring the existing vehicle deceleration of said vehicle to determine a value of ground-vehicle deceleration,
    (b) supplying a pressure to said brake,
    (c) measuring the deceleration of said vehicle after said pressure in step (b) has been supplied to the brake to determine a value of vehicle test deceleration,
    (d) comparing the value of ground-vehicle deceleration with the value of vehicle test deceleration, and
    (e) if said value of vehicle test deceleration is greater than said value of ground-vehicle deceleration by more than a predetermined tolerance value, repeating steps (a) to (d) with a reduced pressure until the difference between the value of vehicle test deceleration and the value of ground-vehicle deceleration is decreased to no more than the predetermined tolerance value, or
    (f) if said value of vehicle test deceleration is equal to or less than said value of ground-vehicle deceleration, repeating steps (a) to (d) with a higher pressure until the value of vehicle test deceleration exceeds the value of ground-vehicle deceleration by a value which is less than or equal to said predetermined tolerance value.

2. The process as defined in claim 1 wherein said brake is a first brake and the pressure supplied to said first brake in step (b) is a first pressure, wherein said braking system further comprises a second brake, and wherein said process further comprises:
    supplying a second pressure to said second brake,
    releasing the second pressure supplied to said second brake,
    maintaining said first pressure supplied to said first brake for a predetermined trailing time, and
    measuring the deceleration of said vehicle during said trailing time to determine said value of vehicle test deceleration.

3. The process as defined in claim 2 for a vehicle train comprising a motor vehicle and a trailer, said first brake being a trailer braking system, said second brake being a motor vehicle braking system, and said first pressure being a trailer braking pressure transmitted from the motor vehicle braking system to the trailer braking system.

4. The process as defined in claim 2 wherein said first pressure is changed relative to said second pressure as a function of the determined response pressure.

5. A process to determine the response pressure of a brake in a braking system of a vehicle comprising:
    (a) supplying a pressure to said brake,
    (b) measuring the deceleration of said vehicle after the pressure in step (a) has been supplied to the brake to determine a value of vehicle test deceleration,
    (c) releasing the pressure supplied to said brake in step (a),
    (d) measuring the current vehicle deceleration of said vehicle to determine a value of ground-vehicle deceleration,
    (e) comparing the value of ground-vehicle deceleration with the value of vehicle test deceleration, and
    (f) if the value of vehicle test deceleration is greater than the value of ground-vehicle deceleration by more than a predetermined tolerance value, repeating steps (a) to (e) with a reduced pressure until the difference between the value of vehicle test deceleration and ground-vehicle deceleration is decreased to no more than the predetermined tolerance value, or
    (g) if the value of vehicle test deceleration is equal to or less than the value of ground-vehicle deceleration, repeating steps (a) to (e) with a higher pressure until the value of vehicle test deceleration exceeds the value of ground-vehicle deceleration by a value which is less than or equal to said predetermined tolerance value.

6. The process as defined in claim 5 wherein said brake is a first brake and the pressure supplied to said first brake in step (a) is a first pressure, wherein said braking system further comprises a second brake, and wherein said process further comprises:
    supplying a second pressure to said second brake,
    releasing the second pressure supplied to said second brake,
    maintaining said first pressure supplied to said first brake for a predetermined trailing time,
    measuring the deceleration of said vehicle to determine said value of vehicle test deceleration, and
    measuring the deceleration of said vehicle after the trailing time to determine the value of ground-vehicle deceleration.

7. The process as defined in claim 6 for a vehicle train comprising a motor vehicle and a trailer, said first brake being a trailer braking system, said second brake being a motor vehicle braking system, and said first pressure being a trailer braking pressure transmitted from the motor vehicle braking system to the trailer braking system.

8. The process as defined in claim 6 wherein said first pressure is changed relative to said second pressure as a function of the determined response pressure.

* * * * *